Sept. 4, 1951      A. M. YOUNG      2,566,915
HINGE CONSTRUCTION FOR ELECTRIC HEATING DEVICES
Filed Oct. 1, 1948
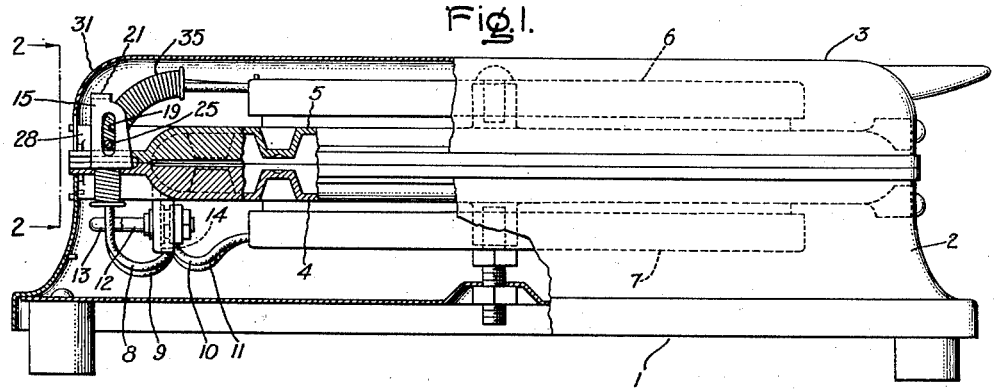
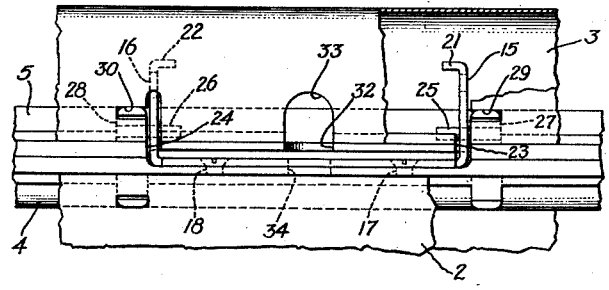
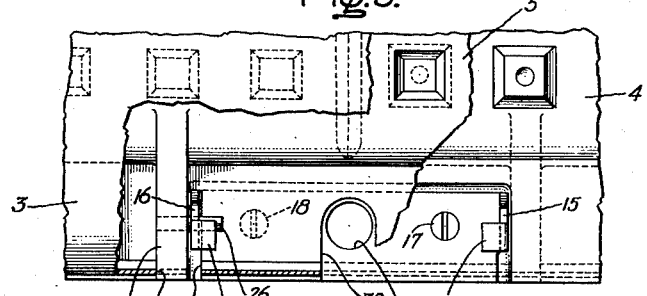
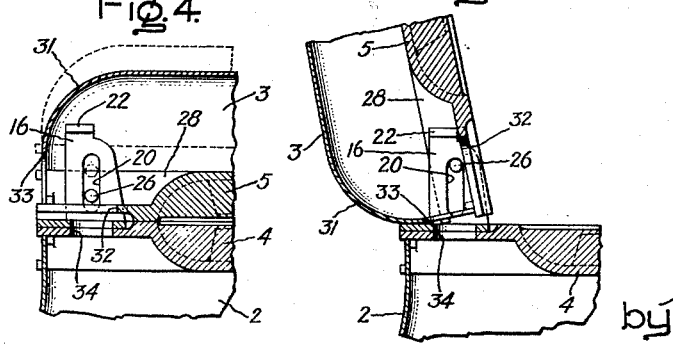
Inventor:
Allan M. Young,
by *Sheridan Biggs*
His Attorney.

Patented Sept. 4, 1951

2,566,915

UNITED STATES PATENT OFFICE 2,566,915

HINGE CONSTRUCTION FOR ELECTRIC HEATING DEVICES

Allan M. Young, Meriden, Conn., assignor to General Electric Company, a corporation of New York Application October 1, 1948, Serial No. 52,383

1 Claim. (Cl. 99—379)

My invention relates to hinges and more particularly to the type of hinges used in electric heating devices such as waffle irons, sandwich grills, or toasters which have two correspondingly aligned heating plates or grids covered by outer shells.

It has among its objects the provision of an improved hinge so constructed as to, first, enable the upper and lower heating plates to separate evenly as the heated substance expands; second, eliminate side-shake of the plates and insure an accurate match between upper and lower plates; third, reduce the amount of motion to the terminal connecting wires; fourth, permit the interior parts of such an electric heating device to be sub-assembled without use of the outer shells; fifth, minimize the danger to the user of being scratched by the hinge or having his clothes caught thereon; and finally, obtain many minor advantages hereinafter more fully described.

In general, my improved hinge is enclosed within an upper shell of an electric heating device and comprises a pair of vertically slotted supporting brackets mounted on a lower heating plate and inserted through slotted apertures in an upper heating plate, these brackets supporting a pair of hinge pins cooperatingly connecting the upper and lower plates so as to make a slidably pivotal hinge.

For a more complete understanding of my invention reference should be had to the accompanying drawing in which Fig. 1 is a side view partly in section of a waffle iron embodying my invention; Fig. 2 is a fragmentary rear view of the waffle iron of Fig. 1, with part of the upper and lower outer shells cut away, taken along line 2—2 in Fig. 1; Fig. 3 is a plan view partly in section of a portion of the waffle iron of Fig. 1; Fig. 4 is a sectional view of the rear of the waffle iron showing the relative positions of the upper and lower grids as they separate vertically; and Fig. 5 shows their relative positions after the upper grid is fully pivoted open.

Referring to the drawing I have shown my invention in Fig. 1 as applied to a waffle iron 1 comprising a lower outer shell 2, an upper outer shell 3, a lower grid 4, an upper grid 5 and the usual upper and lower heating elements 6 and 7 connected by heavy terminal wires 8, 9, 10 and 11, to terminal pins 12 and 13. These terminal pins are attached to the rear side of lower grid 4 by an insulated support 14.

Mounted at the rear of lower grid 4 a short distance within the margin of upper outer shell 3 are a pair of supporting brackets 15 and 16 best seen in Figs. 2 and 3. These brackets are spaced a few inches apart laterally, extend vertically into the space under the upper shell, and are secured to the lower grid 4 by any suitable means such as screws 17 and 18. Cut out of the center of bracket 15 is a vertical hinge slot 19, and similarly cut out of bracket 16 is a vertical hinge slot 20 (shown in Fig. 4). Extending inwardly from the top of these brackets are a pair of back-stop horizontal flanges 21 and 22. As can be seen in Figs. 2 and 3, bracket apertures 23 and 24, shaped in the form of elongated slots to dove-tail on supporting brackets 15 and 16 respectively, are cut or stamped out of the rear edge of upper grid 5. These apertures serve to position the upper grid and to permit its rotation.

Inserted within vertical hinge slots 19 and 20 are a pair of cylindrical hinge pins 25 and 26, respectively; connected by such means as welding, swaging, threading or molding to the upper grid 5. In Figs. 2 and 3 I have shown these hinge pins as threaded or welded to a pair of upper grid rearward extension arms 27 and 28. These extension arms fit contiguously against the outer walls of the supporting brackets 15 and 16 and extend through slots 29 and 30 respectively in the rear of upper outer shell 3, helping thereby to position the upper grid 5 and to hold the outer shell 3 thereon. The cylindrical hinge pins 25 and 26 both pivot and slide vertically within their respective hinge slots, directing the rotation of the upper plate and shell as well as permitting a considerable measure of linear separation between the upper and lower grids.

The upper plate and shell may be rotated until the upper grid 5 rests against horizontal flanges 21 and 22 of the supporting brackets 15 and 16, respectively, as shown on one side in Fig. 5. During this rotation the hinge pins 25 and 26 move upward in their respective hinge slots due to the rotary motion of the upper grid 5 to which they are attached. The height of hinge slots 19 and 20 from the lower grid 4 is slightly greater than the distance from the brackets 15 and 16 to the rear edge of the grids 4 and 5 so that the hinge pins 25 and 26 reach the top of their respective hinge slots coincident with the upper grid 5 reaching the back-stop flanges 21 and 22. Also due to this rotary motion, the curved rear portion 31 of the upper outer shell 3 comes to rest on lower grid 4. Therefore, in its open position the entire upper shell assembly is supported at an angle of approximately 12° beyond a perpendicular to the lower grid by back-stop flanges 21 and 22, hinge pins 25 and 26 at the top of their respective hinge slots, and by the rear curved portion 31 of upper outer shell 3 resting on lower grid 4.

Also cut or stamped out of the edge of upper grid 5 between the bracket apertures 23 and 24 is another larger aperture 32, shown best in Fig. 3, extending back to the upper outer shell 3 in which there is a corresponding aperture 33, shown best in Fig. 2, extending approximately halfway to the top of the shell. Directly under aperture 32 is yet another circular aperture 34 in the lower grid 4, shown best in Fig. 3. These apertures 32, 34 are centered substantially along a line connecting the hinge pins 25, 26 coinciding with the axis of rotation and are provided for a pair of heavy terminal wires 8 and 9 brought up from terminal pins 12 and 13 and connected to the upper heating element 6. These wires are protected from wear by being enclosed in a spring type flexible casing 35 which is in alignment with the plane of the hinge slots 19 and 20.

In a waffle iron embodying my invention as I have described above, as the waffle expands in baking, the grids separate evenly due to the easy vertical movement of hinge pins 25 and 26 in their respective hinge slots, as shown in Fig. 4, producing a more evenly bake waffle. The dovetailing of bracket apertures 23 and 24 on supporting brackets 15 and 16 respectively, reinforced by the contiguous position of hinge supporting extension arms 27 and 28, eliminates side shake of the grids and insures an accurate match between upper and lower grids. The upper shell assembly is solidly supported in its open position as previously described and illustrated in Fig. 5. The manner in which the terminal connecting wires, fully encased in a spring type flexible casing, are brought up through the center of the hinge, in the plane of the hinge slots, greatly reduces the amount of motion to the wires and minimizes the danger of wire breakage.

Furthermore, all the interior parts of the waffle iron I have shown embodying my invention may be subassembled without the upper and lower outer shells, thereby lessening the possibility of damaging the finished shells. Still further, a hinge, such as I have described, almost completely enclosed by the outer shell of the waffle iron gives a more pleasing appearance to the heating device and eliminates the danger that the user may be scratched or have his clothes caught by any protruding flanges.

Although I have shown my invention as applied to an electric waffle iron, there are many other electric heating devices having correspondingly aligned heating plates or grids connected by a hinge, such as electric sandwich grills and electric toasters, to which my invention could equally apply.

It will also be understood that I do not wish to be limited to the particular embodiment of my invention I have shown above since many modifications may be made, as for example, in the method of attaching the hinge pins to the upper plate. I, therefore, contemplate by the appended claim to cover such modifications as fall within the true spirit and scope of my invention.

What I claim as new and desire to secure by Letters Patent of the United States is:

In an electric heating device, the combination comprising a pair of upper and lower correspondingly aligned plates, an outer shell covering said upper plate, heating elements for said plates, a pair of vertically slotted supporting brackets mounted at spaced points on said lower plate and extending through said upper plate within said shell, said upper plate having a pair of apertures extending from an edge thereof through which said brackets are inserted, a pair of hinge pins secured to said upper plate each respectively inserted through the vertical slot of an associated one of said supporting brackets to form a vertically slidable and pivotal hinge connection, said shell having a pair of apertures extending from an edge thereof and aligned to said upper plate apertures to enable the shell to pass over said brackets when the upper plate is pivoted, said vertical bracket slots having a maximum height above said lower plate slightly greater than the distance of said hinge pins from the edge of said upper plate to enable said plates to be pivoted on said hinge to a maximum open position slightly more than 90 angular degrees apart and each bracket having a flange at the top arranged to come in contact with said upper plate at said maximum open position whereby said upper plate is supported in said maximum open position by each flange, each hinge pin at the top of its associated bracket slot, and the outer surface of said shell resting on said lower plate.

ALLAN M. YOUNG.

REFERENCES CITED

The following references are of record in the file of this patent:

UNITED STATES PATENTS

| Number | Name | Date |
|---|---|---|
| 1,299,228 | Ricketson | Apr. 1, 1919 |
| 1,778,263 | Lamb | Oct. 14, 1930 |
| 1,837,232 | Reinhardt | Dec. 22, 1931 |
| 1,866,874 | Barnes | July 12, 1932 |
| 2,025,664 | Taylor | Dec. 24, 1935 |
| 2,354,240 | Young et al. | July 25, 1944 |
| 2,383,331 | Michaelis | Aug. 21, 1945 |